United States Patent
Bikumandla et al.

(10) Patent No.: US 10,323,930 B1
(45) Date of Patent: Jun. 18, 2019

(54) SYSTEMS AND METHODS FOR A MOVABLE STRUCTURED LIGHT PROJECTOR

(71) Applicant: FACEBOOK TECHNOLOGIES, LLC, Menlo Park, CA (US)

(72) Inventors: Manoj Bikumandla, Union City, CA (US); Andrew Matthew Bardagjy, Fremont, CA (US); Cina Hazegh, Walnut Creek, CA (US); Fei Liu, San Jose, CA (US); Bradley James Tallon, San Jose, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 15/813,080

(22) Filed: Nov. 14, 2017

(51) Int. Cl.
| | |
|---|---|
| *H04N 5/235* | (2006.01) |
| *G01B 11/02* | (2006.01) |
| *G09G 3/34* | (2006.01) |
| *G06T 5/50* | (2006.01) |
| *G06T 7/521* | (2017.01) |
| *G06T 5/00* | (2006.01) |

(52) U.S. Cl.
CPC ............ *G01B 11/024* (2013.01); *G06T 5/007* (2013.01); *G06T 5/50* (2013.01); *G06T 7/521* (2017.01); *G09G 3/3433* (2013.01); *H04N 5/2355* (2013.01)

(58) Field of Classification Search
CPC ................ G06T 7/521; G06T 5/007

USPC ........................................................ 348/239
See application file for complete search history.

(56) References Cited

U.S. PATENT DOCUMENTS

| | | | |
|---|---|---|---|
| 6,064,759 A | 5/2000 | Buckley et al. | |
| 9,554,057 B2 | 1/2017 | Appia et al. | |
| 2003/0039388 A1* | 2/2003 | Ulrich ................ | G01B 11/2513 |
| | | | 382/145 |
| 2005/0007652 A1 | 1/2005 | Winkler et al. | |
| 2010/0121201 A1* | 5/2010 | Papaioannou ......... | A61B 5/445 |
| | | | 600/477 |

OTHER PUBLICATIONS

Gerig, Guido, "Structured Lighting," CS 6320, 3D Computer Vision, Spring 2012, Carnegie Mellon Univ. (as accessed Oct. 23, 2017).

* cited by examiner

*Primary Examiner* — Joel W Fosselman
(74) *Attorney, Agent, or Firm* — FisherBroyles, LLP

(57) ABSTRACT

A system for a movable structured light projector may include (1) a light projector assembly that receives a light control signal and projects structured light into a local area based on the light control signal, (2) an imaging device that receives a capture control signal and captures a reflection of the structured light from the local area based on the capture control signal, and (3) an actuator, coupled to the light projector assembly, that receives an actuator control signal and moves the light projector assembly relative to the imaging device based on the actuator control signal. Various other systems and methods are also disclosed.

19 Claims, 11 Drawing Sheets

SYSTEMS AND METHODS FOR A MOVABLE STRUCTURED LIGHT PROJECTOR

BACKGROUND

Some imaging systems (e.g., camera systems employed in conjunction with virtual reality (VR) or augmented reality (AR) devices) project structured light (e.g., predetermined patterns, such as lines, spots, and so on), whether in the visible spectrum, infrared (IR) spectrum, near-infrared (NIR) spectrum, or another wavelength band, into a local area or environment. An imaging subsystem or device may then capture images of the reflections of the projected structured light from the local area. A control system may then process the images to "map" the local area, such as by determining the distance from the imaging subsystem to each lighted portion of the local area based on the geometry of the reflected light patterns perceived via the imaging subsystem. In some systems, this process is referred to as "active triangulation."

For effective triangulation, the distance between the projector and the imaging subsystem, their relative orientation, and possibly other characteristics associating the projector to the imaging subsystem are inputs for calculations that are typically performed as part of the mapping operation. Generally, small errors in the values of those characteristics may result in significant errors in the generated map of the local area. For example, since many devices that employ mapping position the projector and the imaging subsystem close to each other (e.g., to save space in the device), an error of even a few microns may serve to negatively impact the accuracy of the map. While the device may be closely calibrated, such as by a manufacturer prior to normal operation, subsequent use of the device, including possibly unintended physical shocks or impacts to the device, may change the calibrated or measured characteristics, thus lessening map accuracy.

SUMMARY

As will be described in greater detail below, the instant disclosure describes systems and methods for a moveable structured light projector. In one example, a system may include (1) a light projector assembly that receives a light control signal and projects structured light into a local area based on the light control signal, (2) an imaging device that receives a capture control signal and captures a reflection of the structured light from the local area based on the capture control signal, and (3) an actuator, coupled to the light projector assembly, that receives an actuator control signal and moves the light projector assembly relative to the imaging device based on the actuator control signal. In some examples, the imaging device may define an imaging plane at which the reflection of the structured light is captured, and the actuator may move the light projector assembly along a plane parallel to the imaging plane.

In some embodiments, the actuator may translate the light projector assembly along the plane parallel to the imaging plane. In some additional examples, the actuator may translate the light projector assembly along a first axis within the plane parallel to the imaging plane. In other embodiments, the actuator may translate the light projector assembly along a first axis within the plane parallel to the imaging plane and along a second axis within the plane parallel to the imaging plane and perpendicular to the first axis. In some examples, the actuator may rotate the light projector assembly about an axis normal to the plane parallel to the imaging plane.

In some examples, the light projector assembly may include a vertical-cavity surface-emitting laser (VCSEL). Additionally, the plane parallel to the imaging plane may be a plane parallel to a surface of the VCSEL that emits the structured light. Moreover, the actuator may perform at least one of translating the light projector assembly along the plane parallel to the surface of the VCSEL that emits the structured light or rotating the light projector assembly about an axis normal to the plane parallel to the surface of the VCSEL that emits the structured light.

In at least some embodiments, the actuator may include a microelectromechanical system (MEMS) actuator. In other examples, the actuator may include a voice coil actuator. In some examples, the light projector assembly may include a diffractive optical element (DOE) that generates a pattern for the structured light. Also in some embodiments, the system may include a printed circuit board upon which the actuator and the imaging device may be mounted.

In some examples, the system may include a control system that may generate the light control signal, the capture control signal, and the actuator control signal to determine an optimum position for the light projector assembly for mapping the local area using the light projector assembly and the imaging device. In some embodiments, such a control system may generate the light control signal, the capture control signal, and the actuator control signal to capture a first image of the reflection of the structured light at a first position of the light projector assembly and a second image of the reflection of the structured light at a second position of the light projector assembly different from the first position to map the local area. In some other examples, such a control system may generate the light control signal, the capture control signal, and the actuator control signal to capture a single image of the reflection of the structured light at a first position of the light projector assembly and the reflection of the structured light at a second position of the light projector assembly different from the first position to map the local area.

In another example, a system may include (1) a light projector assembly that receives a light control signal and projects structured light into a local area based on the light control signal, (2) an imaging device that receives a capture control signal and captures a reflection of the structured light from the local area based on the capture control signal, (3) an actuator that receives an actuator control signal and moves the light projector assembly relative to the imaging device based on the actuator control signal, (4) a control system that generates the light control signal, the capture control signal, and the actuator control signal to generate a map of the local area using the reflection of the structured light captured by the imaging device, and (5) a display system that displays a virtual environment based on the map of the local area.

In another embodiment, a method may include (1) moving, using an actuator, a light projector assembly to a first position relative to an imaging device, (2) projecting, using the light projector assembly at the first position, structured light into a local area, (3) moving, using the actuator, the light projector assembly to a second position relative to the imaging device different from the first position, (4) projecting, using the light projector assembly at the second position, the structured light into the local area, and (5) capturing, using the imaging device, at least one image of a reflection of the structured light from the local area. In some embodiments, the capturing of the at least one image may include (1) capturing a first image of the reflection of the structured light projected from the light projector assembly at the first position, and (2) capturing a second image of the reflection of the structured light projected from the light projector assembly at the second position. In other examples, the capturing of the at least one image may include capturing a single image of the reflection of the structured light projected from the light projector assembly at the first position and the second position.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
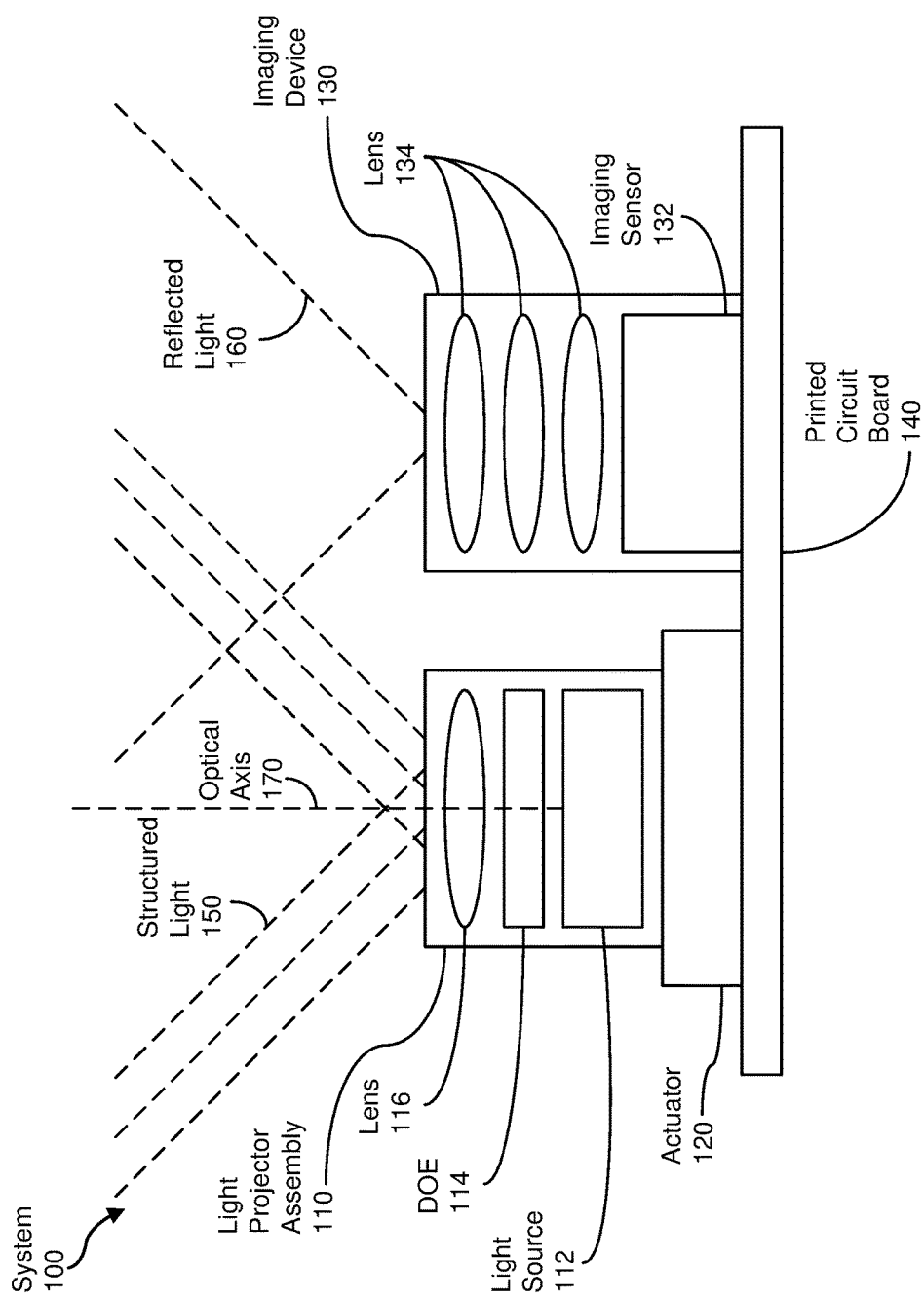
FIG. 1 is a side view of an example system employing an example movable light projector assembly.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for a movable structured light projector. As will be explained in greater detail below, some embodiments of the instant disclosure may include (1) a light projector assembly that receives a light control signal and projects structured light into a local area based on the light control signal, (2) an imaging device that receives a capture control signal and captures a reflection of the structured light from the local area based on the capture control signal, and (3) an actuator, coupled to the light projector assembly, that receives an actuator control signal and moves the light projector assembly relative to the imaging device based on the actuator control signal. By employing the actuator to move the light projector assembly, the position of the light projector assembly may be precisely adjusted during a calibration process, thus potentially reducing or eliminating the need to accurately position the light projector assembly during a manufacturing or assembly phase. In some examples, the actuator may move the light projector assembly during a local area mapping operation to increase resolution of the resulting map by way of spatial and/or temporal multiplexing of the structured light emitted using the light projector assembly.

Figure 2:
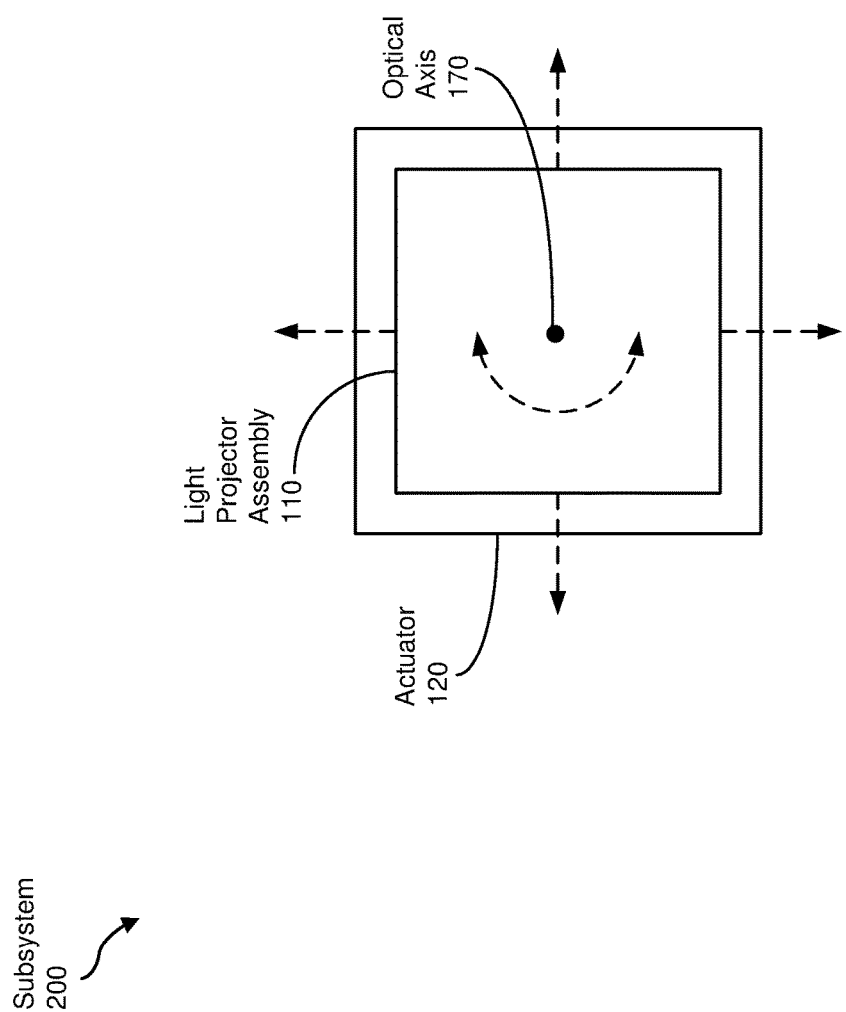
FIG. 2 is a top view of the example light projector assembly and corresponding example actuator of FIG. 1 for moving the light projector assembly.
Figure 4:
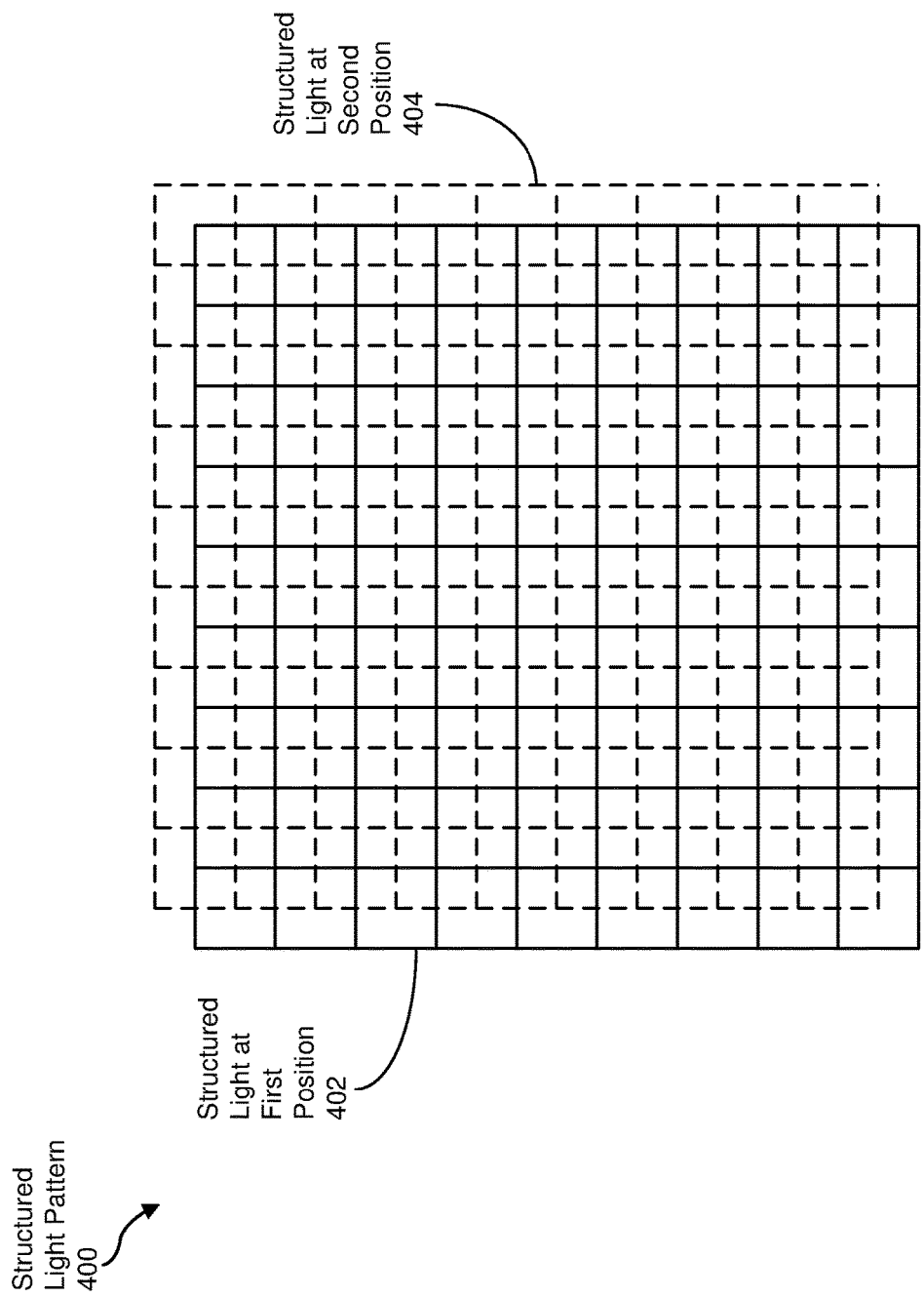
FIG. 4 is an example structured light pattern that may be produced by an example light projector assembly that may be translated in an x-y plane.
Figure 5:
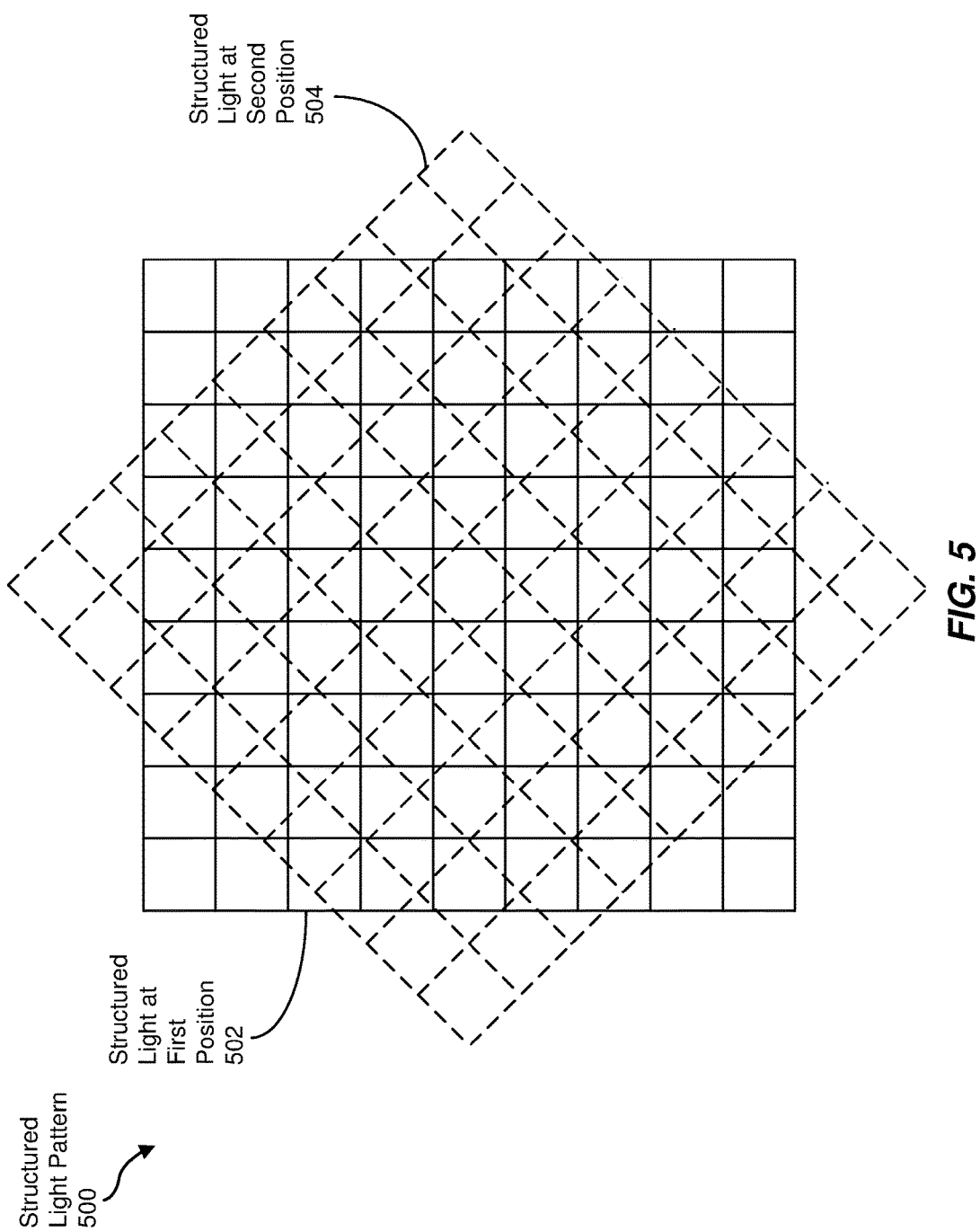
FIG. 5 is an example structured light pattern that may be produced by an example light projector assembly that may be rotated in an x-y plane.
Figure 6:
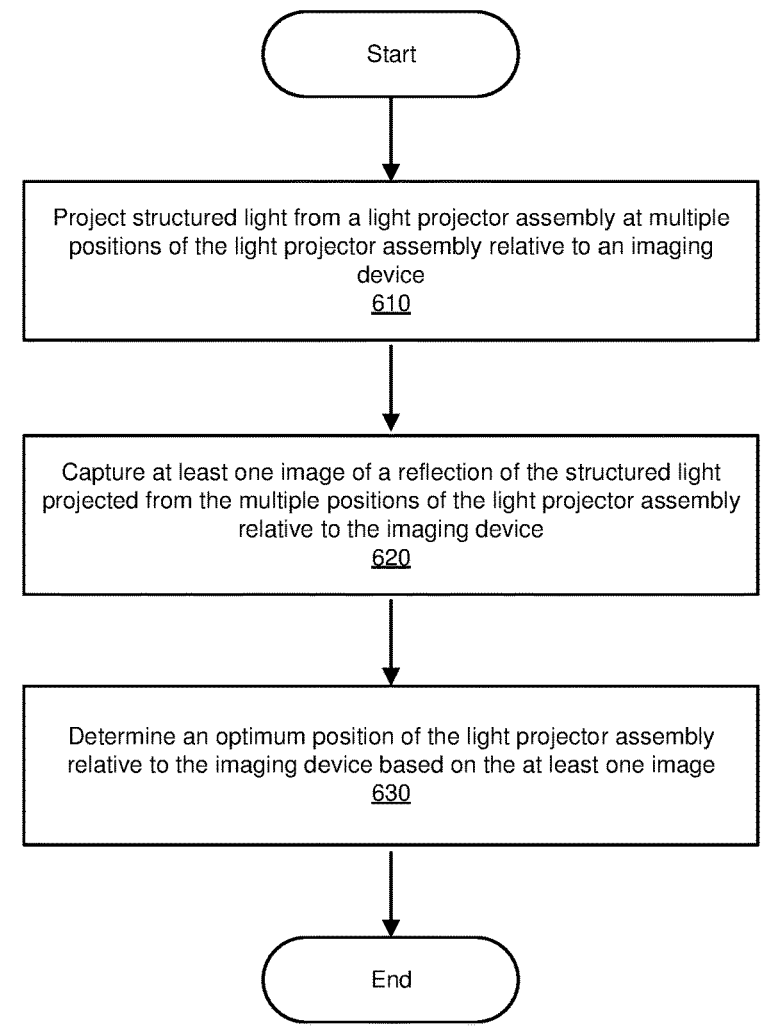
FIG. 6 is a flow diagram of an example method of calibrating the example system of FIG. 1.
Figure 7:
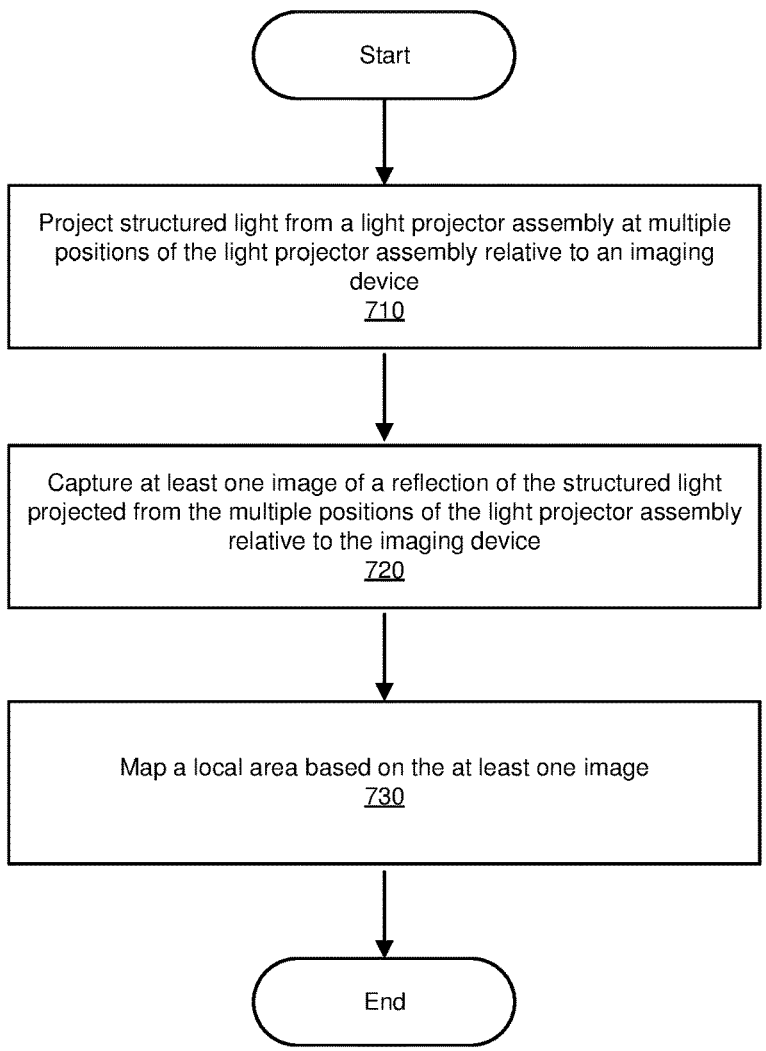
FIG. 7 is a flow diagram of an example method of mapping a local area using the example system of FIG. 1.
Figure 8:
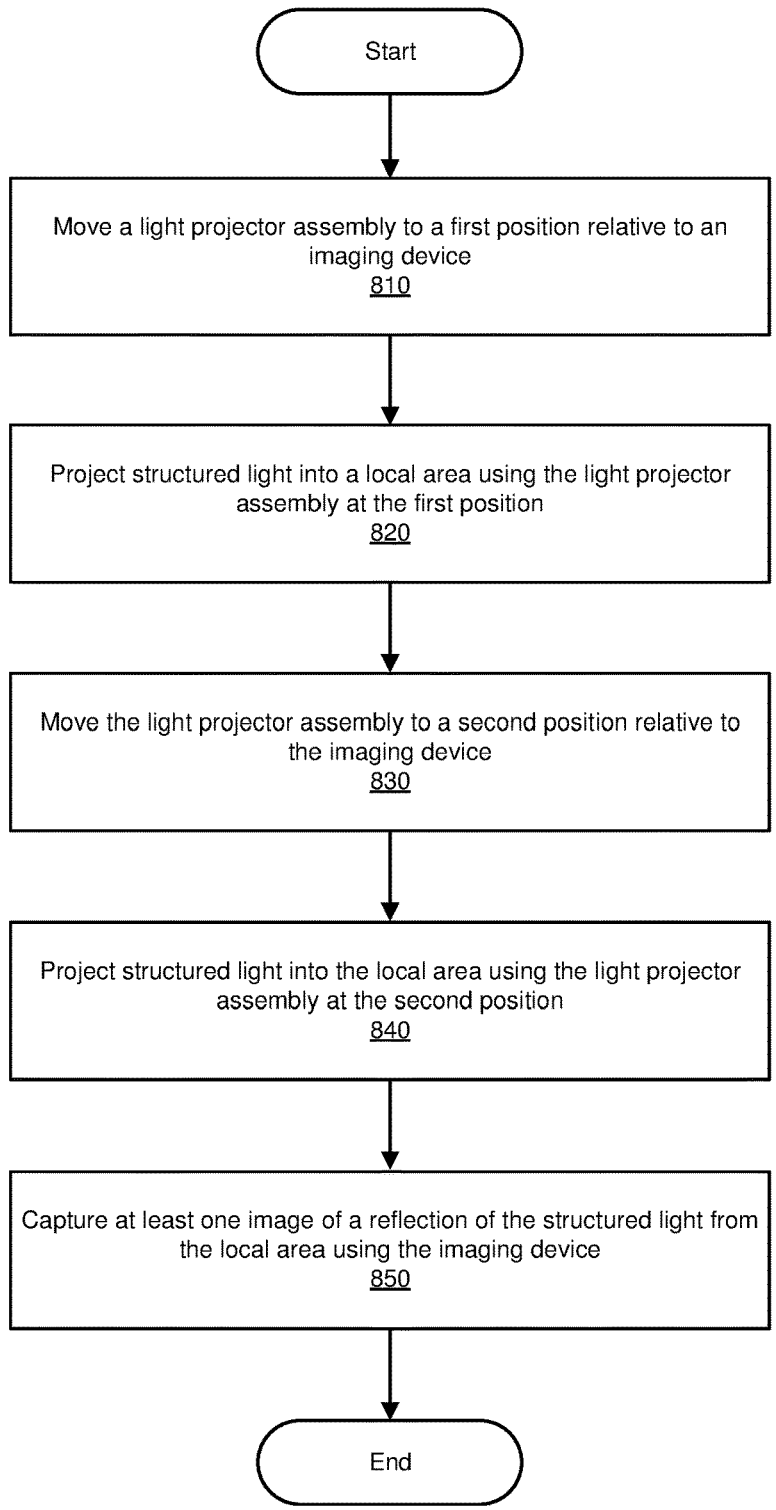
FIG. 8 is a flow diagram of an example method of capturing images using the example system of FIG. 1.

The following will provide, with reference to FIGS. 1-11, detailed descriptions of various example systems and methods for a movable structured light projector assembly. More specifically, a discussion of an example system employing an example light projector assembly is presented in conjunction with FIGS. 1 and 2. In association with FIG. 3, the physical structure of example diffractive optical elements (DOES) that may be employed in the light projector assembly of FIGS. 1 and 2 are described. Example structured light patterns that may be generated based on movement of a light projector assembly are discussed in connection with FIGS. 4 and 5. Methods of calibration and operation using the example system of FIG. 1, as depicted in FIGS. 6-8, respectively, are presented below. In conjunction with FIGS. 9-11, examples of a head-mounted display system including an example movable structured light projector system are discussed.

FIG. 1 is a block diagram of a system 100 employing a movable light projector assembly 110. In some examples, the system 100 may be an imaging system for mapping or otherwise imaging a local area within which the system 100 is located. As depicted in FIG. 1, system 100 may include a light projector assembly 110 mechanically coupled to an actuator 120, as well as an imaging device 130. In the particular example of FIG. 1, actuator 120 and imaging device 130 are stably coupled to each other via a printed circuit board (PCB) 140 that may also couple actuator 120 and imaging device 130 (and possibly light projector assembly 110) to other electronic circuitry, such as a control system (e.g., microprocessor, microcontroller, and/or other circuitry) for controlling those components of system 100. However, in other embodiments, actuator 120 and imaging device 130 may be mechanically intercoupled using another physical structure.

In some examples, light projector assembly 110 may project structured light 150, which may include one or more light patterns (e.g., spots, lines, grids, and/or the like), onto the local area. In the specific example of FIG. 1, light projector assembly 110 may include a light source 112, a diffractive optical element (DOE) 114, and a lens 116. Example embodiments of DOE 114 are discussed below in conjunction with FIG. 3. In some examples, light projector assembly 110 may also include one or more additional elements (e.g. additional DOEs 114 and lenses 116, as well as other filters and other optical components). In some embodiments, light source 112 may be a vertical-cavity surface-emitting laser (VCSEL) that emits light in a perpendicular direction from a top surface, as oriented in the example of FIG. 1. In other examples, light source 112 may be another type of light source (e.g., an edge-emitting laser (EEL) optically coupled to DOE 114 and lens 116 by way of a prism, mirror, lens, and/or other optical elements). In some examples, light source 112 may produce IR, NIR, or other light not in the visible spectrum, while in other embodiments, light source 112 may produce visible light. In some embodiments, lens 116 may be a projector lens that projects patterned light received from DOE 114 onto the local area. One or more optical components (e.g., DOE 114, lens 116, and/or so on) may be included within a mechanical structure not explicitly shown in FIG. 1. As illustrated in FIG. 1, light projector assembly 110 may define an optical axis 170 along which lens 116, DOE 114, and light source 112 are aligned to project structured light 150.

Imaging device 130, as illustrated in FIG. 1, may include one or more lenses 134 and an imaging sensor 132. While FIG. 1 depicts three lenses 134, one or more lenses 134 (e.g., objective lens, collimating lens, and/or the like) may be employed in other examples. Imaging sensor 132 may be, for example, a complementary metal-oxide-semiconductor (CMOS) image sensor, a charge-coupled device (CCD) image sensor, or any other sensor capable of receiving light and encoding information from the received light in digital signals. Imaging sensor 132 may be included in an image sensor module, package, or housing (not explicitly depicted in FIG. 1) along with lenses 134. Lenses 134, in some examples, may be moved by one or more actuators (also not shown in FIG. 1) to adjust and focus reflected light 160 from the local area onto photosensitive components of imaging sensor 132. In some embodiments, imaging device 130 may also include one or more optical filters.

Actuator 120 may be any suitable actuator, such as a mechanical or electromechanical actuator, for moving light projector assembly 110 with a high degree of precision. In some embodiments, actuator 120 may be an electromechanical actuator, such as a microelectromechanical system (MEMS) (e.g., a distributed electrostatic microactuator), a voice coil actuator (VCA), or another type of actuator that may move light projector assembly 110 relative to PCB 140, and thus imaging sensor 132. In some embodiments, actuator 120 may move light projector assembly 110 along or within a plane parallel to an imaging plane defined by imaging sensor 132 (e.g., a plane defined by a surface of imaging sensor 132 upon which reflected light 160 is incident). In some examples, actuator 120 may move light projector assembly 110 along or within a plane perpendicular to optical axis 170. Also in some embodiments, the imaging plane defined by imaging sensor 132 may be parallel to optical axis 170. In other examples, actuator 120 may move light projector assembly 110 within or along another plane not specifically referenced above. Also, in some embodiments, actuator 120 may include, or communicate with, one or more location sensors that provide feedback indicating the current location of light projector assembly 110 so that light projector assembly 110 may be positioned as intended (e.g., by a control system tasked with moving light projector assembly 110 using actuator 120).

FIG. 2 is a top view of light projector assembly 110 and actuator 120 in some examples. As shown in FIG. 2, actuator 120 may translate and/or rotate light projector assembly 110 within a plane perpendicular to optical axis 170. In some examples, actuator 120 may translate light projector assembly 110 along one or both an x-axis or a y-axis perpendicular to the x-axis within a plane perpendicular to optical axis 170. In some embodiments, actuator 120 may additionally or alternatively rotate light projector assembly 110 about optical axis 170. In some other examples, the plane perpendicular to optical axis 170 within which actuator 120 moves light projector assembly 110 may be parallel to the imaging plane of imaging sensor 132.

Figure 3:
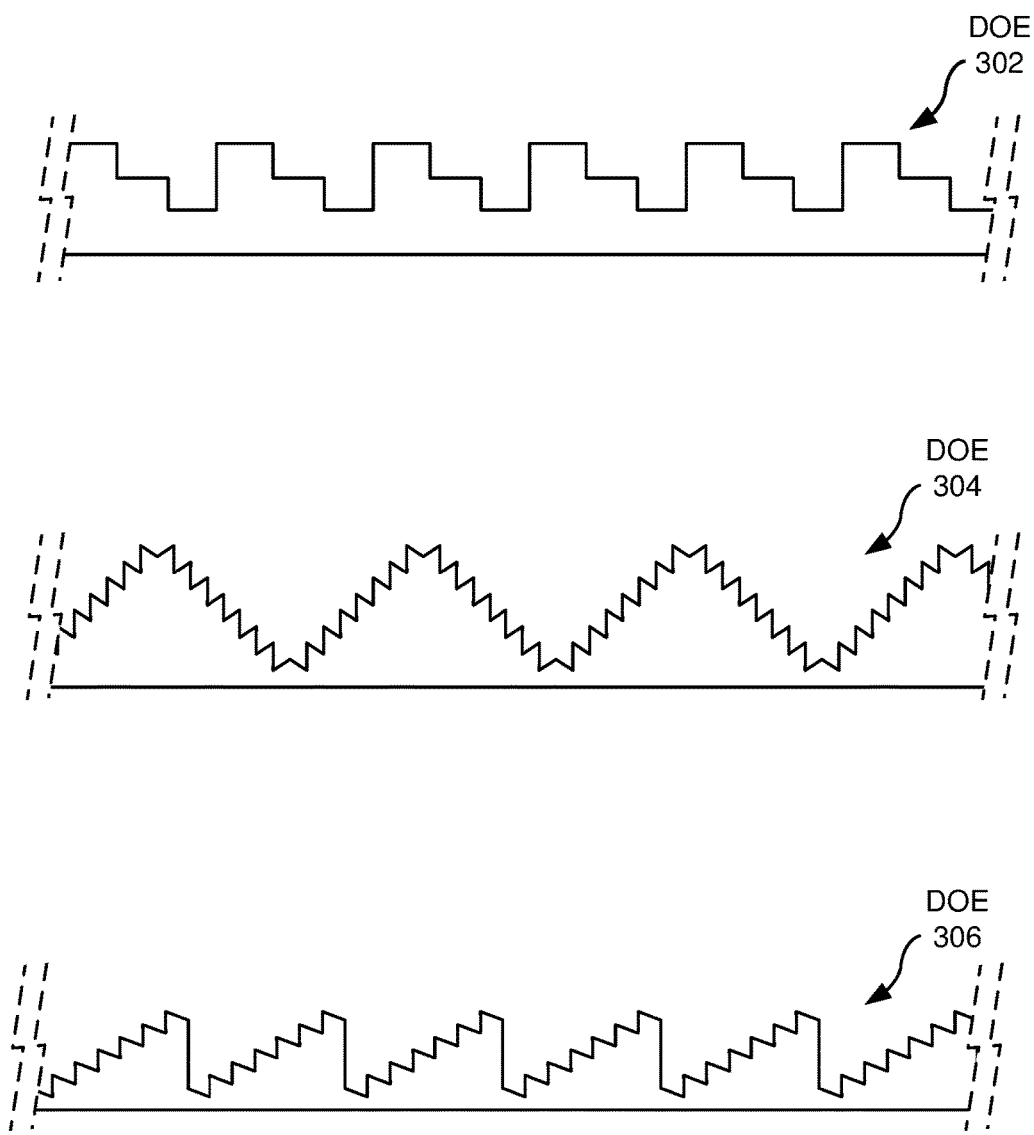
FIG. 3 includes partial cross-sectional views of example diffractive optical elements employable in the example movable light projector assembly of FIG. 1.

FIG. 3 provides partial cross-sectional views of three different example DOEs (a first DOE 302, a second DOE 304, and a third DOE 306) that may serve as DOE 114 of light projector assembly 110. First DOE 302 includes, for example, a horizontal step pattern. In some examples, the steps may have a top surface parallel to a bottom surface of DOE 302. The width of the steps may be the same or different, and the height difference between adjacent steps may also be the same or different. The horizontal step pattern of DOE 302 may be the same across the entire structure or may have regions that are different (e.g., including a different step pattern). Second DOE 304 includes, for example, a series of pyramidal structures having steps on either side. These steps may be angled with respect to the bottom surface of DOE 304. The angles may be in a range from approximately 15 degrees to approximately 75 degrees and may be uniform or nonuniform, such that some of the steps may have different angled top surfaces. Third DOE 306 includes, for example, a structure with a plurality of steps (angled as shown, but parallel to the bottom surface of DOE 306 in other embodiments) that ascend to a highest step and then drop (rather than gradually descend, as in DOE 304) to the lowest step in the pattern. In some embodiments, the depicted cross-sections of DOEs 302, 304, and 306 may extend the full length of DOE 114. Other embodiments may include different cross-sectional configurations, such that the pattern varies in x- and y-directions of the top surface of DOE 114. In other embodiments, DOE 114 may be provided by diffraction gratings having different spacings therebetween. In some examples, the motion imparted by actuator 120 on light projector assembly 110, whether by translating and/or rotating, may be in a plane parallel to the top and/or bottom surface of DOE 114 (e.g., DOEs 302, 304, and/or 306).

FIG. 4 depicts an example structured light pattern 400 projected by light projector assembly 110 into the local area based on a diffracted light pattern provided by DOE 114, and based on translation imparted by actuator 120 on light projector assembly 110 in an x-y plane. As shown in FIG. 4, structured light pattern 400 includes structured light 402 projected by light projector assembly 110 in a first position and structured light 404 projected by light projector assembly 110 in a second position translated in both x- and y-directions from the first position. In FIG. 4, while structured light 402 is shown as a solid-line grid and structured light 404 is depicted as a dashed-line grid, this distinction is employed in FIG. 4 to emphasize the difference in x-y position of two identical diffracted light patterns produced using the same DOE 114. In this particular example, structured light pattern 400 may be a grid with higher resolution than that provided by DOE 114 when light projector assembly 110 resides in a single position.

FIG. 5 depicts an example structured light pattern 500 projected by light projector assembly 110 into the local area based on a diffracted light pattern provided by DOE 114, and based on rotation imparted by actuator 120 on light projector assembly 110 about optical axis 170. As illustrated in FIG. 5, structured light pattern 500 includes structured light 502 projected by light projector assembly 110 in a first position and structured light 504 projected by light projector assembly 110 in a second position resulting from rotation of structured light 502 rotated about optical axis 170 from the first position. Similar to the illustration of FIG. 4, structured light 502 of FIG. 5 is shown as a solid-line grid and structured light 504 is depicted as a dashed-line grid to emphasize the difference in rotational position of two identical diffracted light patterns produced using the same DOE 114. As a result of this rotation, structured light 450 may be a structured light pattern with higher resolution than that provided by DOE 114 when light projector assembly 110 resides in a single position.

In some embodiments, the use of actuator 120 to produce high-resolution structured light patterns (e.g., structured light patterns 400 and 500 of FIGS. 4 and 5) based on a single lower-resolution light pattern provided by DOE 114 may facilitate the use of a lower complexity and/or lower resolution, and thus relatively inexpensive, DOE 114. While structured light patterns 400 and 500 of FIGS. 4 and 5 may be produced using structured light in a grid pattern provided by DOE 114, other types of structured light (e.g., lines, spots, and so on) may be employed in other embodiments. Also, in some examples, actuator 120 may impart both translational and rotational motion on light projector assembly 110 to project an even greater number of high-resolution structured light patterns onto the local area. By increasing the resolution of the structured light patterns being projected, a resulting map of the local area based on the structured light patterns may be of a corresponding high resolution.

FIG. 6 is a flow diagram of an example method 600 of calibrating a system having a movable light projector assembly (e.g., system 100 of FIG. 1, including light projector assembly 110). The steps shown in FIG. 6, as well as those in FIG. 7, described below, may be performed by any suitable computer-executable code and/or computing system, such as a control system that generates a light control signal for light projector assembly 110, a capture control signal for imaging device 130, and an actuator control signal for actuator 120, each of which controls the functions ascribed to each of these components of system 100 of FIG. 1. For example, the light control signal may cause light projector assembly 110 to project structured light into a local area. In some embodiments, the capture control signal may cause imaging device 130 to capture a reflection of the structured light from the local area. Moreover, in some examples, the capture control signal may indicate a timing of the capturing of the reflections. Also in some embodiments, the actuator control signal may control one of more aspects (e.g., timing, magnitude, direction, and/or the like) of actuator 120 to move light projector assembly 110 relative to imaging device 130.

In some embodiments, such a control system may generate the light control signal, the capture control signal, and/or the actuator control signal to employ captured reflections of structure light (e.g., using imaging device 130) for one or more purposes, such as to calibrate a nominal position for light projector assembly 110, to generate a map of a local area in which system 100 is located, and so on, as discussed herein. In some additional embodiments described in greater detail below, system 100 may include, or may be coupled with, a display system for displaying a virtual environment (e.g., to a user), wherein the virtual environment is based on the generated map. In some examples, each of the control signals may include multiple control signals to perform a particular function. Also, in some examples, each of the steps shown in FIGS. 6 and 7 may represent an algorithm whose structure includes and/or is represented by multiple sub-steps.

In method 600, at step 610, structured light may be projected from a light projector assembly (e.g., light projector assembly 110) at multiple positions of the light projector assembly relative to an imaging device (e.g., imaging device 130) (see, e.g., FIGS. 1, 2, 4, and 5). In some embodiments, an actuator (e.g., actuator 120) may move (e.g., translates and/or rotates) the light projector assembly among the multiple positions. At step 620, at least one image of a reflection of the structured light projected from the multiple positions of the light projector assembly relative to the imaging device may be captured. In some examples, the imaging device may capture a single image of a reflection for each position of the multiple positions of the light projector assembly. At step 630, an optimum position of the light projector assembly relative to the imaging device may be determined (e.g., using a control system, as described above) based on the at least one image captured by the imaging device.

In some examples, the local area from which the reflection of the structured light is received may include a known object or other predetermined visual background from which an expected or optimum image is to be captured, presuming the light projector assembly is located in an expected or optimum position relative to the imaging device. Consequently, method 600 may be employed to calibrate an optimum location of the light projector assembly prior to operating the imaging system (e.g., system 100) for mapping of a local area. In some embodiments, a manufacturer may perform such a calibration prior to distribution or sale of the system to an end user. During subsequent mapping operations, the light projector assembly may remain at the optimum position determined during calibrations, while in other examples, the actuator may move (e.g., translate and/or rotate) the light projector assembly relative to the imaging device to generate higher resolution maps of the local area, as discussed above.

FIG. 7 is a flow diagram of an example method 700 of mapping a local area using a system having a movable light projector assembly (e.g., system 100 of FIG. 1). At step 710, structured light may be projected from a light projector assembly (e.g., light projector assembly 110) at multiple positions of the light projector assembly relative to an imaging device (e.g., imaging device 130) (see, e.g., FIGS. 1, 2, 4, and 5). In some examples, an actuator (e.g., actuator 120) may move (e.g., may translate and/or rotate) the light projector assembly among the multiple positions. At step 720, at least one image of a reflection of the structured light from the multiple positions of the light projector assembly relative to the imaging device may be captured (e.g., using imaging device 130). At step 730, the local area from which the reflections are captured may be mapped (e.g., by a control system, as discussed above) based on the at least one image.

FIG. 8 is a flow diagram of an example method 800 of imaging a local area using reflections of structured light projected into the local area. Method 800 may be employed in conjunction with method 600 of FIG. 6 and/or method 700 of FIG. 7. At step 810, a light projector assembly (e.g., light projector assembly 110) may be moved (e.g., using actuator 120) to a first position relative to an imaging device (e.g., imaging device 130) (see, e.g., FIGS. 1, 2, 4, and 5). At step 820, structured light may be projected into the local area using the light projector assembly at the first position. At step 830, the light projector assembly may be moved to a second position relative to the imaging device. At step 840, structured light may be projected into the local area using the light projector assembly at the second position. At step 850, using the imaging device, at least one image may be captured of a reflection of the structured light from the local area.

In some examples of method 800, a single image may be captured for each reflection from the local area associated with a single position of the light projector assembly relative to the imaging device. For example, a first image may be captured when the light projector assembly is located at the first position, while a second, separate image may be captured when the light projector assembly is located at the second position. As a result, in such examples, each captured image may employ a single pattern (e.g., generated using DOE 114) projected onto different portions of the local area being mapped over some period of time, resulting in temporal multiplexing of the single pattern onto the local area. In addition, with the perspective of the imaging device relative to the light projector assembly being different for each position, a greater field of view (FOV) of the local area may be provided for each orientation of the overall system (e.g., system 100) relative to the local area, possibly resulting in a high-resolution mapping operation over a relatively large portion of the local area.

In some embodiments, a single image may be captured for a reflection from the local area associated with multiple positions (e.g., the first position and the second position of method 800) of the light projector assembly relative to the imaging device. For example, an aperture time during which the imaging device is capturing reflections from the local area may span a time during which the light projector assembly is moved among two or more positions relative to the imaging device, resulting in spatial multiplexing of the projected light pattern onto the local area. Consequently, such spatial multiplexing may produce a relatively quick, but high-resolution, mapping operation.

Figure 9:
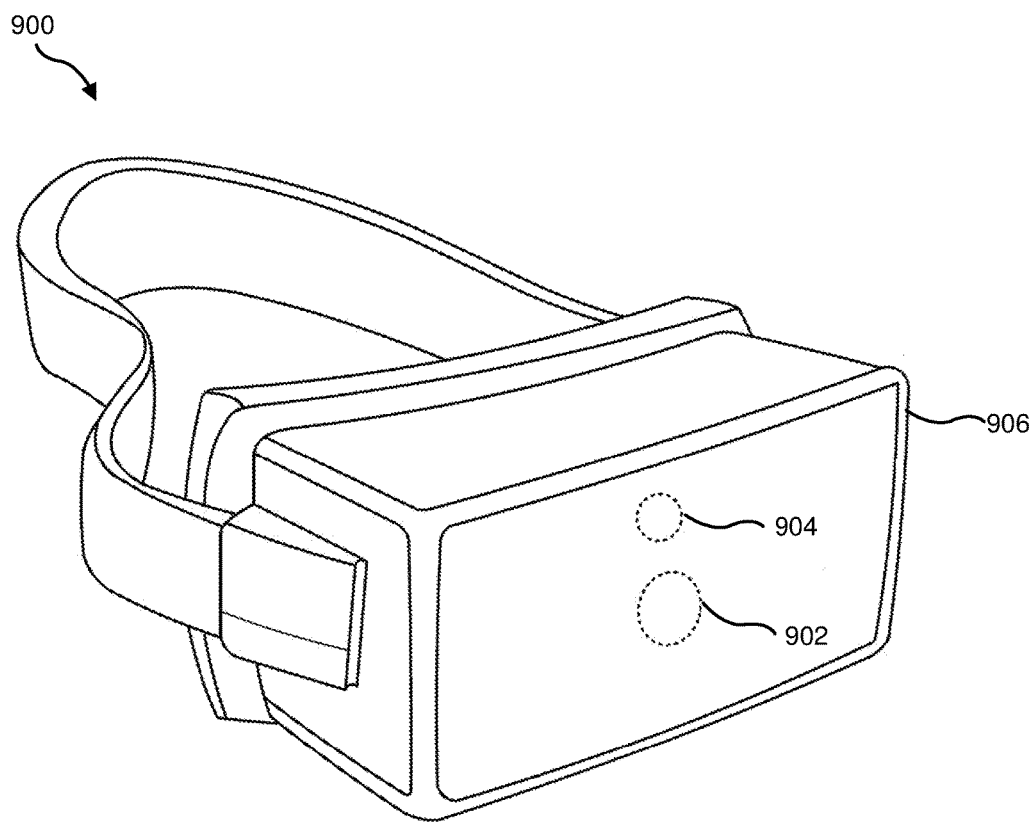
FIG. 9 is a perspective view of an example head-mounted display that may include the example system of FIG. 1.

FIG. 9 is a perspective view of an example head-mounted display 900 that may include a movable structured light projector. In an example, an imaging device 902 or system that incorporates a depth camera assembly or system (e.g., system 100, including light projector assembly 110 and associated actuator 120) may be included within head-mounted display 900. As shown in FIG. 9, head-mounted display 900 may include a front rigid body 906 through which an aperture (included within imaging device 902 (e.g., imaging device 130)) may receive light. In some such examples, imaging device 902 may operate within a local area imaging assembly, which may be included within head-mounted display 900, as illustrated in FIG. 9. In these examples, as will be discussed in greater detail in connection with FIG. 10, the local area imaging assembly may include an illumination source 904 (e.g., light projector assembly 110) which may emit light through front rigid body 906 of head-mounted display 900.

Figure 10:
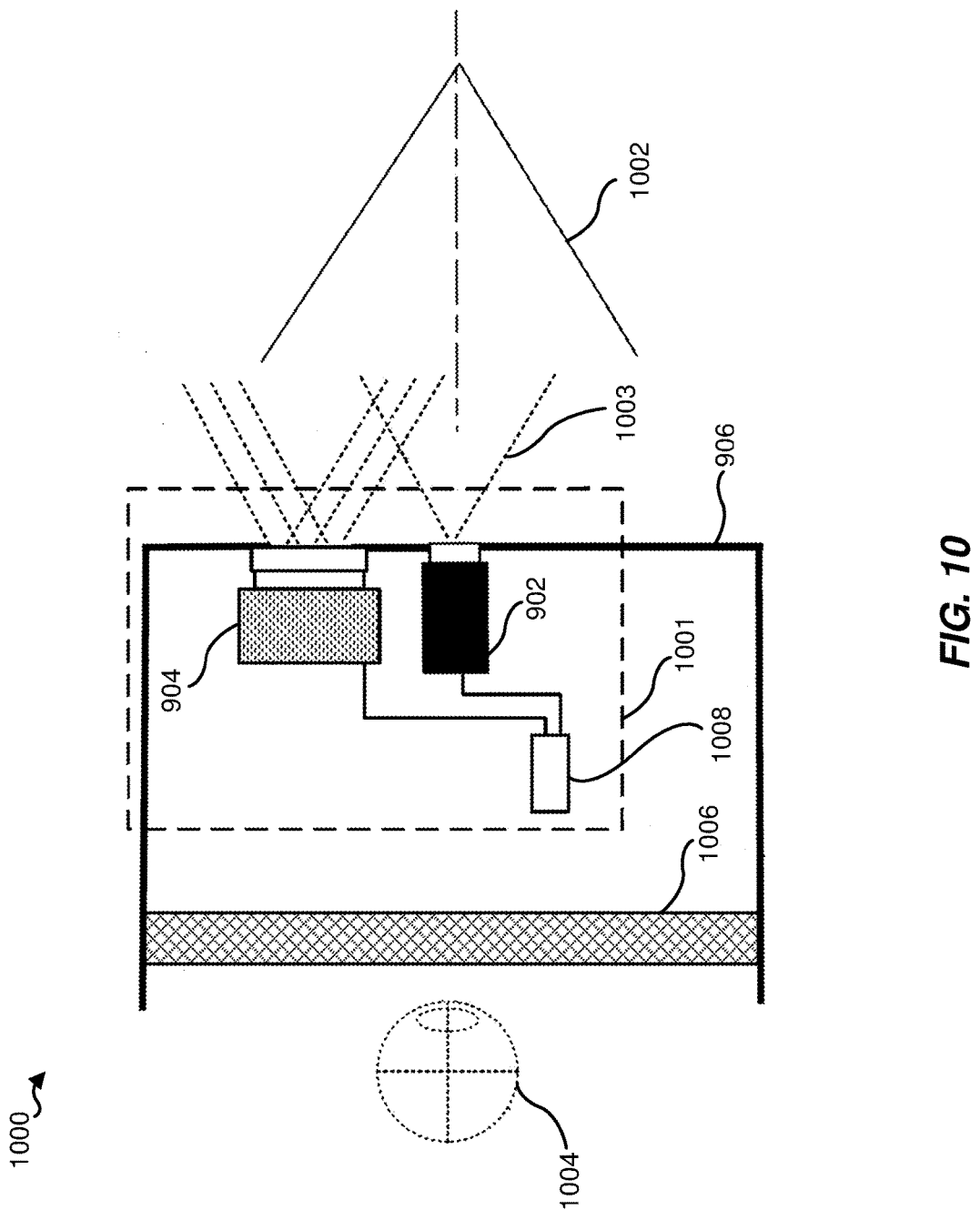
FIG. 10 is a cross-section of the example head-mounted display of FIG. 8.

FIG. 10 represents a cross section of front rigid body 906 of head-mounted display 900. As shown in FIG. 10, head-mounted display 900 may include a local area imaging assembly 1001 (e.g., including system 100). In some examples, local area imaging assembly 1001 may be a device assembly configured to capture image data by way of received light 1003 that is utilized in determining, mapping, and/or tracking position, orientation, and/or movement of objects within an area, such as local area 1002 (e.g., an area surrounding head-mounted display 900). In some examples, local area imaging assembly 1001 may include (1) imaging device 902 and (2) illumination source 904 configured to emit light (i.e., a carrier signal) into local area 1002.

In some embodiments, local area imaging assembly 1001 may determine depth and/or surface information for objects within local area 1002 in a variety of ways. For example, local area imaging assembly 1001 may be utilized in a simultaneous localization and mapping (SLAM) tracking system to identify and/or map features of local area 1002 and/or to identify a location, orientation, and/or movement of head-mounted display 900 and/or other objects (e.g., hand-held controllers, users, etc.) in local area 1002. In some examples, illumination source 904 may emit a structured light pattern (e.g., a symmetric and/or quasi-random dot pattern, a grid pattern, horizontal bars, etc.) into local area 1002. In these examples, local area imaging assembly 1001 may determine the depth and/or surface information based on triangulation or perceived deformation of the emitted pattern. In one embodiment, local area imaging assembly 1001 may capture time-of-flight (TOF) information describing the time required for light emitted from illumination source 904 to be reflected from one or more objects in local area 1002 back to imaging device 902. In this embodiment, local area imaging assembly 1001 may determine a distance between local area imaging assembly 1001 and the objects based on the TOF information.

In some examples, information collected by local area imaging assembly 1001 may be used as part of an image and/or video (e.g., an artificial reality image and/or video) displayed to a user wearing head-mounted display 900. In one example, shown in FIG. 10, the image and/or video may be displayed to a user (e.g., via an eye 1004 of the user) via an electronic display 1006. Electronic display 1006 may represent a single electronic display or multiple electronic displays (e.g., a display for each eye of a user). Examples of electronic display 1006 may include, without limitation, a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, a projector, a cathode ray tube, an optical mixer, and/or some combination thereof. The local area imaging assembly 1001 may also include an imaging controller 1008 (e.g., the control system discussed above in conjunction with FIGS. 1-8) that is coupled to illumination source 904 and/or imaging device 902.

In at least one embodiment, a head-mounted display system including head-mounted display 900 may additionally or alternatively include controller tracking features (e.g., constellation tracking). For example, in addition to determining features of local area 1002, local area imaging assembly 1001 may track a position, orientation, and/or movement of one or more controller devices, such as hand-held controllers, that are utilized by a user for interacting with head-mounted display 900 and/or local area 1002.

Figure 11:
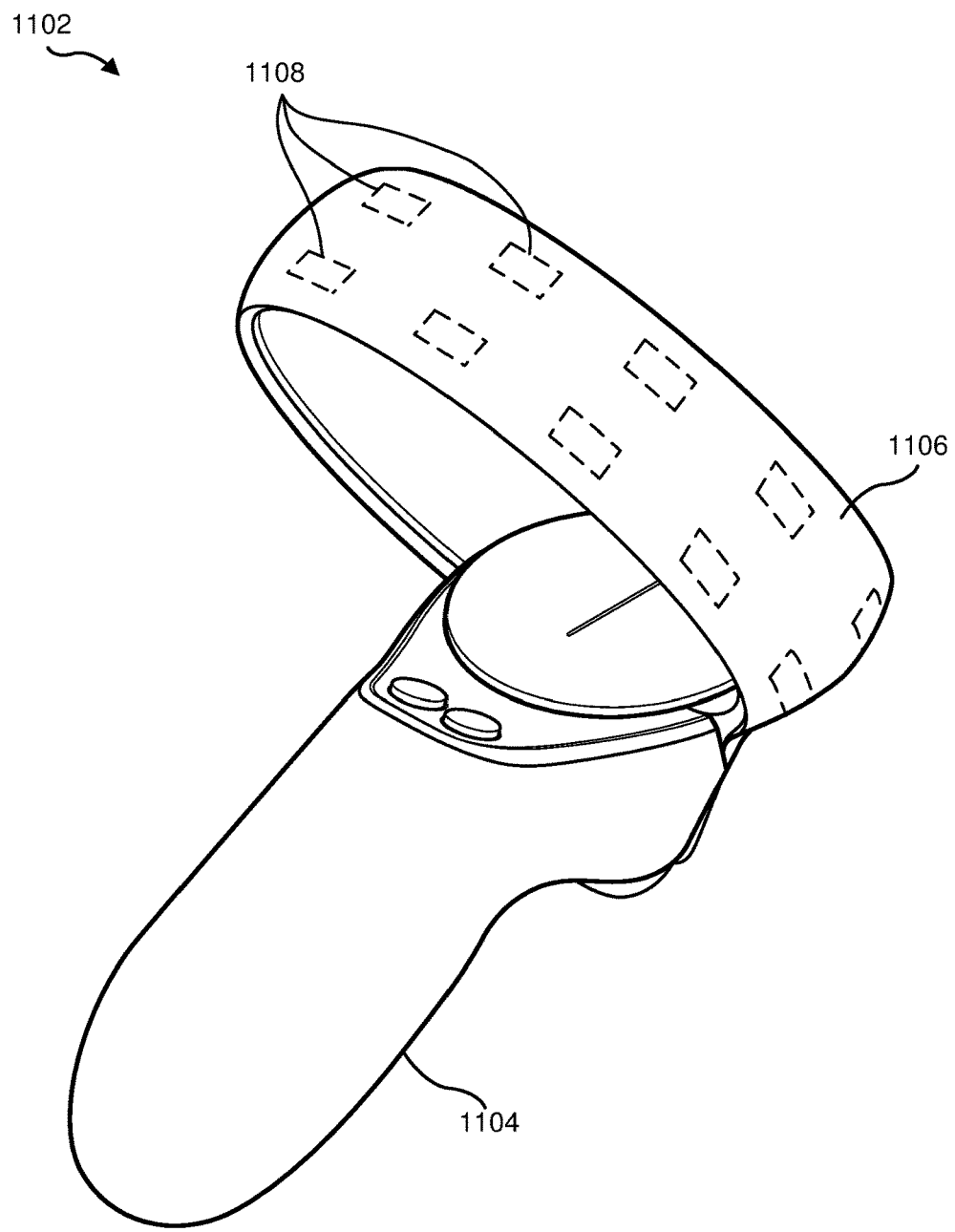
FIG. 11 is a perspective view of an example hand-held controller employable with the example head-mounted display of FIGS. 9 and 10.

FIG. 11 is a perspective view of an example hand-held controller 1102 that may be included in the head-mounted display system that includes head-mounted display 900 in accordance with some embodiments. The head-mounted-display system may include at least one hand-held controller 1102. For example, the head-mounted-display system may include two hand-held controllers 1102, with one hand-held controller 1102 for each of a user's right and left hands. Each hand-held controller 1102 may be communicatively coupled to head-mounted display 900 shown in FIGS. 9 and 10 and/or to a computing device (e.g., a personal computer, a console, etc.) communicatively coupled to head-mounted display 900. Hand-held controller 1102 may be communicatively coupled to head-mounted display 900 via any suitable wireless and/or wired connection.

As shown in FIG. 11, hand-held controller 1102 may include a grip 1104 sized to fit within a user's right or left hand. Hand-held controller 1102 may also include a tracking loop 1106 for tracking position, orientation, and/or movement of hand-held controller 1102 with respect to head-mounted display 900 and/or with respect to local area 1002. For example, tracking loop 1106 may include an array of tracking lights 1108, such as tracking LEDs (e.g., infrared (IR) LEDs), that are used for motion and positional tracking purposes to provide 360-degree motion control while using the head-mounted display system. Controller 1102 may additionally or alternatively include tracking lights, such as tracking LEDs, on any other suitable portion of controller 1102. In at least one embodiment, imaging device 902 may receive light emitted by tracking lights 1108 on hand-held controller 1102, such as tracking LEDs on tracking loop 1106, and local area imaging assembly 1001 may utilize the received light to determine location, orientation, and/or movement of hand-held controller 1102.

According to some embodiments, local area imaging assembly 1001 shown in FIG. 10 may be utilized as part of a hybrid system for (1) SLAM imaging to locate, map, and/or track features of local area 1002 (e.g., using depth and/or surface information, as described above) and (2) controller tracking to determine location, orientation, and/or movement of one or more hand-held controllers 1102 used by a user of the head-mounted display system. Imaging device 902 of local area imaging assembly 1001, for example, may receive and utilize light emitted by hand-held controller 1102 for tracking location, orientation, and/or movement of hand-held controller 1102 relative to head-mounted display 900 and/or local area 1002. Any other suitable ranges of light wavelengths may be respectively utilized for SLAM imaging and controller tracking. In at least one embodiment, separate frames (e.g., alternating frames) captured by imaging device 902 may be respectively utilized by local area imaging assembly 1001 for SLAM imaging and controller tracking as described herein. For example, one or more frames captured by imaging device 902 during a time period may be utilized for SLAM imaging and one or more frames captured by imaging device 902 during a subsequent time period may be utilized for controller tracking.

In some examples, a local area imaging assembly (e.g., local area imaging assembly 1001) with one or more of the features described above may be disposed within an external sensor device for tracking and/or mapping features of local area 1002, portions of the head-mounted display system (e.g., head-mounted display 900, hand-held controllers 1102, etc.), and/or one or more users and/or objects within local area 1002. In some examples, the external sensor device may be a device that is used to detect the position, orientation, and/or motion of an additional device and/or object in a local area of the external sensor device. In one example, local area imaging assembly 1001 may be utilized in an external sensor device that is separate from head-mounted display 900, such as an external sensor bar and/or other suitable external sensor device.

In some examples, the instant disclosure may include a system, such as an artificial reality system, including a local area imaging assembly (e.g., local area imaging assembly 1001), which may include an imaging device (e.g., imaging device 902), with at least one of the features discussed above. Also, in some embodiments, the instant disclosure may include a method for manufacturing, assembling, using, and/or otherwise configuring or creating a system with one or more of the features described herein.

As discussed throughout the instant disclosure, the disclosed systems and methods may provide a moveable light projector assembly, such as for a camera or other imaging system, that may be positioned, such as via a calibration process, to an optimum position for subsequent operations, such as mapping a local area. By providing such movement (e.g., via an actuator), manufacturing constraints regarding the mechanical positioning of the light projector assembly may be relaxed, thus potentially increasing the manufacturing yield of such systems. Furthermore, using the actuator for calibration, in some embodiments, may be simplified compared to a conventional mechanical calibration process, during which the light projector assembly may be positioned manually. The ability to provide such movement may also facilitate ruggedness or resilience to physical shocks and other events that may adversely affect systems employing a stationary light projector assembly by readjusting the position of the light projector assembly using the actuator after such as event.

Also in some examples, a moveable light projector assembly, such as that described herein, may facilitate the use of temporal and/or spatial multiplexing over at least a portion of the local area, as described above, to generate higher resolution imaging (e.g., high-resolution mapping) of that portion. More specifically, by projecting a relatively simple structured light pattern from a light projector assembly that is moved to multiple locations relative to a corresponding imaging device, typically higher resolution of the resulting images may be obtained relative to those generated via a stationary light projector assembly. Additionally, movement of the light projector assembly may also increase the field of view of a particular mapping operation while the encompassing system remains stationary, possibly resulting in greater coverage of the local area at any one time. Moreover, in some examples, "dead zones" in mapping coverage may be reduced or eliminated by an actuator capable of moving the light projector assembly through a continuous range of positions.

Embodiments of the instant disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A system comprising:
   a light projector assembly that receives a light control signal and projects structured light into a local area based on the light control signal;
   an imaging device that receives a capture control signal and captures a reflection of the structured light from the local area based on the capture control signal, wherein the imaging device defines an imaging plane at which the reflection of the structured light is captured; and
   an actuator, coupled to the light projector assembly, that receives an actuator control signal and moves the light projector assembly relative to the imaging device along a plane parallel to the imaging plane based on the actuator control signal.

2. The system of claim 1, wherein the actuator translates the light projector assembly along the plane parallel to the imaging plane.

3. The system of claim 2, wherein the actuator translates the light projector assembly along a first axis within the plane parallel to the imaging plane.

4. The system of claim 2, wherein the actuator translates the light projector assembly along a first axis within the plane parallel to the imaging plane and along a second axis within the plane parallel to the imaging plane and perpendicular to the first axis.

5. The system of claim 1, wherein the actuator rotates the light projector assembly about an axis normal to the plane parallel to the imaging plane.

6. The system of claim 1, wherein the light projector assembly comprises a vertical-cavity surface-emitting laser (VCSEL).

7. The system of claim 6, wherein the plane parallel to the imaging plane comprises a plane parallel to a surface of the VCSEL that emits the structured light.

8. The system of claim 7, wherein the actuator performs at least one of translating the light projector assembly along the plane parallel to the surface of the VCSEL that emits the structured light or rotates the light projector assembly about an axis normal to the plane parallel to the surface of the VCSEL that emits the structured light.

9. The system of claim 1, wherein the actuator comprises a microelectromechanical system (MEMS) actuator.

10. The system of claim 1, wherein the actuator comprises a voice coil actuator.

11. The system of claim 1, wherein the light projector assembly comprises a diffractive optical element (DOE) that generates a pattern for the structured light.

12. The system of claim 1, further comprising a printed circuit board upon which the actuator and the imaging device are mounted.

13. The system of claim 1, further comprising a control system that generates the light control signal, the capture control signal, and the actuator control signal to determine an optimum position for the light projector assembly for mapping the local area using the light projector assembly and the imaging device.

14. The system of claim 1, further comprising a control system that generates the light control signal, the capture control signal, and the actuator control signal to capture a first image of the reflection of the structured light at a first position of the light projector assembly and a second image of the reflection of the structured light at a second position of the light projector assembly different from the first position to map the local area.

15. The system of claim 1, further comprising a control system that generates the light control signal, the capture control signal, and the actuator control signal to capture a single image of the reflection of the structured light at a first position of the light projector assembly and the reflection of the structured light at a second position of the light projector assembly different from the first position to map the local area.

16. A system comprising:
    a light projector assembly that receives a light control signal and projects structured light into a local area based on the light control signal;
    an imaging device that receives a capture control signal and captures a reflection of the structured light from the local area based on the capture control signal, wherein the imaging device defines an imaging plane at which the reflection of the structured light is captured;
    an actuator that receives an actuator control signal and moves the light projector assembly relative to the imaging device along a plane parallel to the imaging plane based on the actuator control signal;
    a control system that generates the light control signal, the capture control signal, and the actuator control signal to generate a map of the local area using the reflection of the structured light captured by the imaging device; and
    a display system that displays a virtual environment based on the map of the local area.

17. A method comprising:
    moving, using an actuator, a light projector assembly to a first position relative to an imaging device;
    projecting, using the light projector assembly at the first position, structured light into a local area;
    moving, using the actuator, the light projector assembly to a second position relative to the imaging device different from the first position;
    projecting, using the light projector assembly at the second position, the structured light into the local area; and
    capturing, using the imaging device, at least one image of a reflection of the structured light from the local area;
    wherein the imaging device defines an imaging plane at which the at least one image of the reflection of the structured light is captured, and wherein the actuator moves the light project assembly relative to the imaging device along a plane parallel to the imaging plane.

18. The method of claim 17, wherein the capturing of the at least one image comprises:

capturing a first image of the reflection of the structured light projected from the light projector assembly at the first position; and capturing a second image of the reflection of the structured light projected from the light projector assembly at the second position.

19. The method of claim 17, wherein the capturing of the at least one image comprises:

capturing a single image of the reflection of the structured light projected from the light projector assembly at the first position and the second position.

\* \* \* \* \*